(12) United States Patent
Sumitomo

(10) Patent No.: US 8,982,498 B2
(45) Date of Patent: Mar. 17, 2015

(54) SWITCHING REGULATOR, MOTOR DRIVE DEVICE, MAGNETIC DISK STORAGE DEVICE, AND ELECTRONIC APPARATUS

(71) Applicant: Rohm Co., Ltd., Kyoto (JP)

(72) Inventor: Hironori Sumitomo, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 13/918,289

(22) Filed: Jun. 14, 2013

(65) Prior Publication Data
US 2014/0368950 A1  Dec. 18, 2014

(51) Int. Cl.
G11B 5/02 (2006.01)
H02M 3/158 (2006.01)
H02P 5/68 (2006.01)
G11B 19/20 (2006.01)
H02M 3/155 (2006.01)
H02P 5/00 (2006.01)

(52) U.S. Cl.
CPC ............ *H02M 3/158* (2013.01); *H02P 5/68* (2013.01); *G11B 19/2009* (2013.01); *H02M 2003/1557* (2013.01); *H02P 2005/16* (2013.01)
USPC ........................................................ 360/67

(58) Field of Classification Search
None
See application file for complete search history.

(56) References Cited

U.S. PATENT DOCUMENTS

| 4,575,668 | A  | * | 3/1986  | Baker ............................ 318/811 |
| 5,828,200 | A  | * | 10/1998 | Ligman et al. ................ 318/807 |
| 7,054,089 | B2 | * | 5/2006  | Kokami ..................... 360/73.03 |
| 7,408,790 | B2 | * | 8/2008  | Hansson et al. ................ 363/16 |

FOREIGN PATENT DOCUMENTS

JP  2011-135730 A  7/2011

* cited by examiner

*Primary Examiner* — K. Wong
(74) *Attorney, Agent, or Firm* — Cantor Colburn LLP

(57) ABSTRACT

A switching regulator has an output stage which, with an output switch element, an inductor, a rectifying element, and a smoothing element, generates an output voltage from an input voltage, a divided voltage generator which generates a divided voltage from a switch voltage generated at one terminal of the rectifying element, a selector which outputs one of the divided voltage and a fixed voltage in accordance with a switching signal as a select voltage, a zero-cross comparator which monitors the select voltage to generate a zero-cross detection signal, and a controller which generates the switching signal in accordance with the necessity of monitoring the zero-cross of an inductor current and which performs on/off control of the output switch element reflecting the zero-cross detection signal.

11 Claims, 8 Drawing Sheets

SWITCHING REGULATOR, MOTOR DRIVE DEVICE, MAGNETIC DISK STORAGE DEVICE, AND ELECTRONIC APPARATUS

BACKGROUND OF THE INVENTION

1. Field of the Invention

The invention described in this specification relates to a switching regulator.

2. Description of Related Art

Generally, a switching regulator is proposed, which detects that a inductor current is not flowing into an rectifying element by always monitoring the voltage across both terminals of the rectifying element located onto a current path of the inductor current with a zero-cross comparator (a recirculation detection comparator) to improve power conversion efficiency by reflecting detection results thereof to on/off control of an output switch element (cf., JP-A-2011-135730).

However, in the switching regulator of the conventional structure, pulse skips of the zero-cross comparator arising from signal delay and the like are be easy to occur, and a problem can occur to the on/off control of the output switch element.

SUMMARY OF THE INVENTION

In light of the above problem found by the inventor of the present application, it is an object of the present invention to provide a switching regulator that is able to prevent pulse skips of the zero-cross comparator.

A switching regulator according to the present invention has an output stage which, with an output switch element, an inductor, a rectifying element, and a smoothing element, generates an output voltage from an input voltage, a divided voltage generator which generates a divided voltage from a switch voltage generated at one terminal of the rectifying element, a selector which outputs one of the divided voltage and a fixed voltage in accordance with a switching signal as a select voltage, a zero-cross comparator which monitors the select voltage to generate a zero-cross detection signal, and a controller which generates the switching signal in accordance with the necessity of monitoring the zero-cross of an inductor current and which performs on/off control of the output switch element reflecting the zero-cross detection signal.

Here, as to the invention described in present specification, other features, elements, steps, advantages and characteristics of the present invention will become more apparent from the following detailed description of preferred embodiments of the present invention and the attached drawings.

DETAILED DESCRIPTION OF PREFERRED EMBODIMENTS

Motor Drive Device

Figure 1:
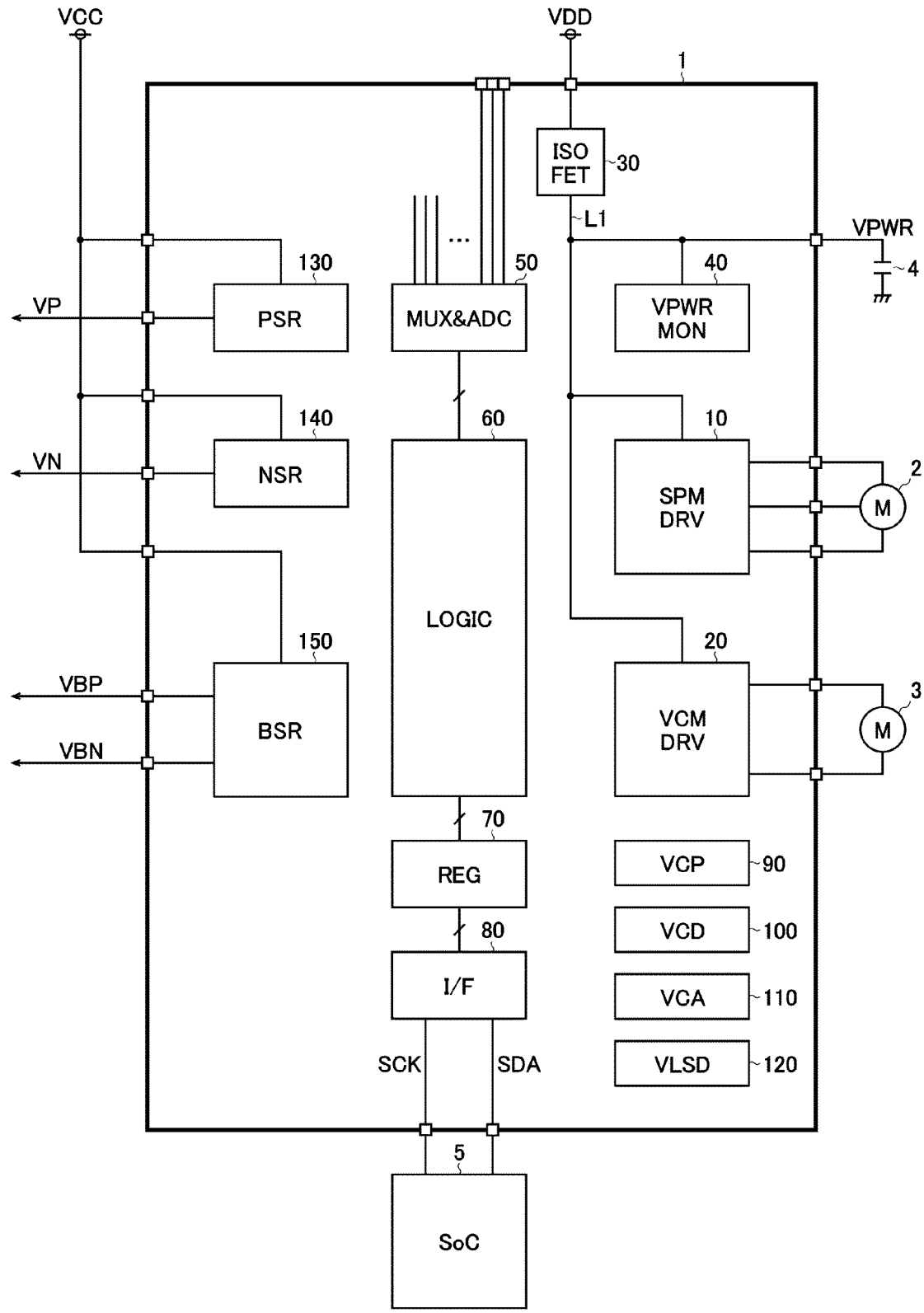
FIG. 1 is a block diagram showing a structural example of a motor drive device.

FIG. 1 is a block diagram showing a structural example of a motor drive device. The motor drive device 1 of this structural example is a monolithic semiconductor integrated circuit device (i.e., a system motor driver LSI) which performs drive control of a spindle motor 2 and a voice coil motor 3 used in a hard disk drive: has a spindle motor driver 10; a voice coil motor driver 20; an insulation switch 30; a power voltage monitor 40; A/D converter 50; a logic unit 60; a register 70; serial interface 80; a charge pump 90; an internal regulator 100, 110 and 120, a step-down switching regulator 130; an inverting switching regulator 140; and step-up switching regulator 150.

Besides, the motor drive device 1 has various kinds of sensor detection circuits to monitor an output of an external sensor (a shock sensor, a pressure sensor, a temperature sensor, and so on) except the above-mentioned structural elements. Here, the whole structure of the hard disk drive that incorporates the motor drive device 1 are illustrated below in detail.

A power supply voltage VDD (e.g., 12V) is applied from a host of an external device to a power supply line L1 of a motor drive system as a power voltage VPWR for driving the spindle motor 10 and the voice coil motor driver 20. Here, a capacitor 4 for smoothing the power voltage VPWR is provided in the form of an external component to the power supply line L1.

The spindle motor driver 10 is connected to the power supply line L1, and rotates a platter (a magnetic disk) at predetermined rotation speeds by rotating the spindle motor 2 (e.g., a 3-phase brushless DC motor in the present structural example) with the power supply voltage VDD when the power supply voltage VDD is normal. On the other hand, the spindle motor driver 10 rectifies phase voltages, one for each phase, generated during idling of the spindle motor 2, and regenerates rectified phase voltages to the power supply line L1 as the power voltage VPWR when the power supply voltage VDD is abnormal (e.g., power supply interruptions, instantaneous power failure, and so on). The power voltage VPWR is provided for relevant parts (e.g., the voice coil motor 20 etc.) of the motor drive device 1 via the power supply line L1.

The voice coil motor driver 20 is connected to the power supply line L1, and moves a magnetic head on the platter in a tracking mode by driving the voice coil motor 3 with the power supply voltage VDD when the power supply voltage VDD is normal. On the other hand, the voice coil motor driver 20 drives the voice coil motor 20 with the power voltage VPWR regenerating from the spindle motor driver 10 to the power supply line L1 when the power supply voltage VDD is abnormal. Thus, it is possible to operate the magnetic head automatically to an outside lamp mechanism further than an outermost circumference of the platter. A collision between the magnetic head and the platter is avoidable in advance by possessing such a power off retract function when the power supply voltage VDD is abnormal.

The insulation switch 30 is a backflow prevention element which connects and disconnects a power supply pin (an external terminal to apply the power supply voltage VDD) of the motor driver 1 and the power supply line L1 to and from each other. The insulation switch 30 turns on when the power supply voltage VDD is normal, and turns off when the power supply voltage VDD is abnormal. A MOSFET [metal oxide semiconductor field effect transistor], a diode and the like are preferably usable as the insulation switch 30.

The power voltage monitor 40 monitors the power voltage VPWR applied to the power supply line L1 to decide that the power voltage VPWR is normal or abnormal (consequently, to decide that the power supply voltage VDD is normal or abnormal). The decision of the power voltage monitor 40 is used for on/off control of the insulation switch 30, operation mode switch control (switch control of normal mode/rectified regeneration mode) of the spindle motor driver 10, etc.

The A/D converter 50 converts a plurality of analog signals inputted from the inside and the outside of devices into digital signals to output the digital signals to the logic unit 60.

The logic unit 60 controls entire operation of the motor drive device 1 based on various digital signals inputted from the A/D converter 50, various register data read from the register 70, and so on.

The register 70 stores the various register data written from a microcomputer 5 (SoC [system-on chip]) and the logic unit 60 in a volatile manner.

The serial interface 80 performs, for example, serial communication with the microcomputer 5 (a main element controlling entire operation of a hard disk drive) located to the outside of the motor drive device 1 based on a SPI [serial peripheral interface] standard.

The charge pump 90 generates a step-up voltage VCP (e.g., VPWR+5V) by raising the power voltage VPWR in charge pump operation.

The internal regulator 100 generates an internal power supply voltage VCD (e.g., 1.5V) for a digital system by stepping down the power supply voltage VDD (e.g., 12V) or a power supply voltage VCC (e.g., 5V).

The internal regulator 110 generates an internal power supply voltage VCA (e.g., 1.5V) for an analog system by stepping down the power supply voltage VDD or the power supply voltage VCC.

The internal regulator 120 generates an internal power supply voltage VLSD (e.g., 5V) for driving a low side gate by stepping down the step-up voltage VCP.

The step-down switching regulator 130 generates a positive voltage VP (e.g., 0.9V, 1.8V, 2.5V, or 3.3V) by stepping down the power supply voltage VCC. The positive voltage VP is used as a positive power supply voltage (e.g., a power supply voltage for a core of the microcomputer 5 or a power supply voltage for a memory) of each part of the hard disk drive.

The inverting switching regulator 140 generates a negative voltage VN (e.g., −5V) by inverting the power supply voltage VCC. The negative voltage VN is used as a negative voltage (e.g., a negative power supply voltage for a head amplifier) of each part of the hard disk drive.

The step-up switching regulator 150 generates a positive step-up voltage VBP and a negative step-up voltage VBN (e.g., ±17V) by stepping up the power supply voltage VCC to a positive direction and a negative direction. The positive step-up voltage VBP and the negative step-up voltage VBN are respectively used as a positive and negative power supply voltage (e.g., a positive and negative power supply voltage for a piezoelectric actuator built into the magnetic head) of each part of the hard disk drive.

<Step-Up Switching Regulator>

Figure 2:
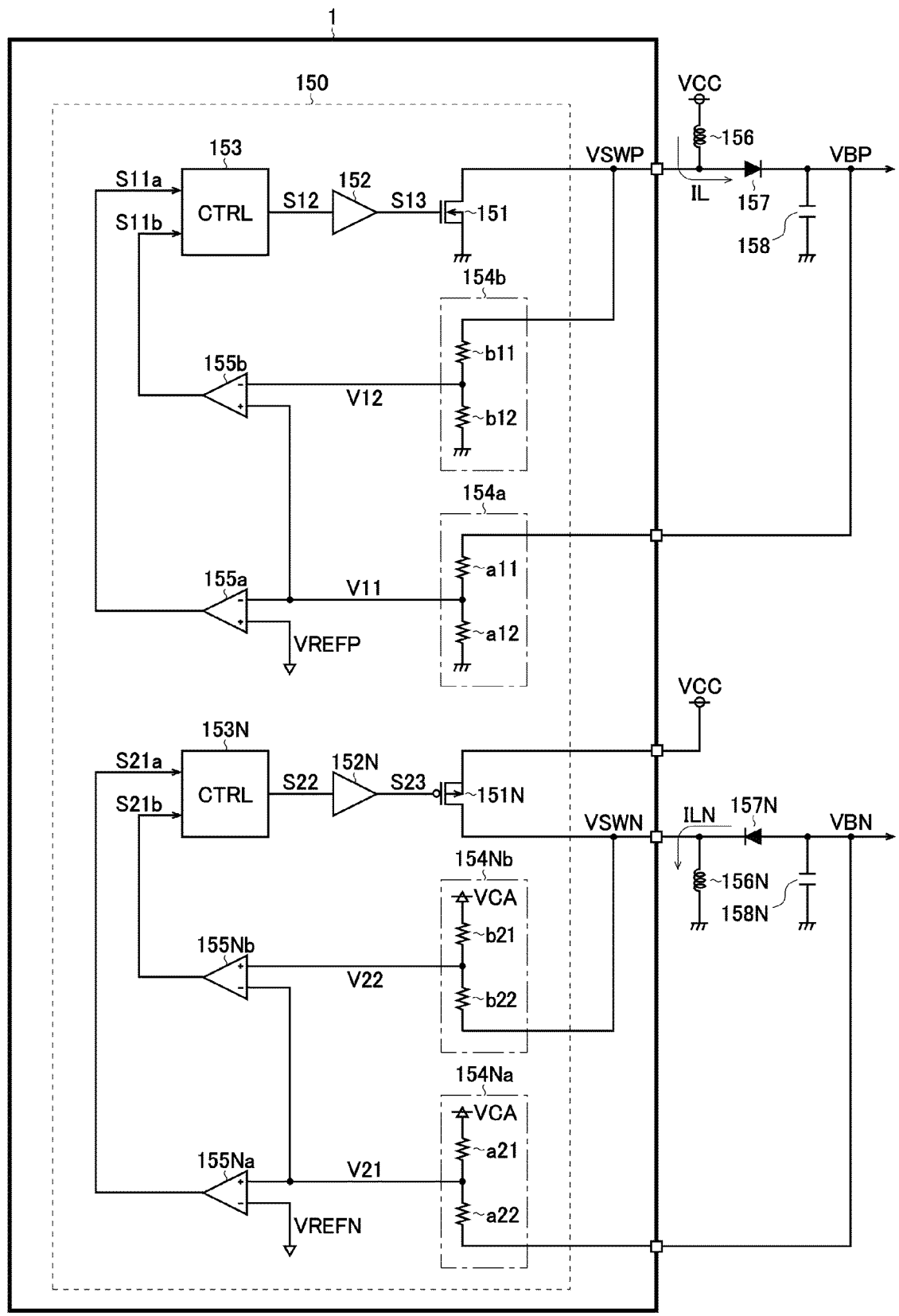
FIG. 2 is a block diagram showing a first structural example of a step-up switching regulator 150.

FIG. 2 is a block diagram showing a first structural example of a step-up switching regulator 150. The step-up switching regulator 150 in the first structural example includes an NMOSFET [N-channel-type MOSFET] 151, a pre-driver 152, a controller 153, a feedback voltage generator 154a, a divided voltage generator 154b, a main comparator 155a, a zero-cross comparator 155b, an inductor 156, a diode 157, and a capacitor 158, as circuit elements for generating a positive step-up voltage VBP from the power supply voltage VCC. Here, the inductor 156, the diode 157, and the capacitor 158 are discrete parts provided in the form of external components to the motor drive device 1.

The NMOSFET 151, the inductor 156, the diode 157, and the capacitor 158 are circuit elements which form a positive step-up type power output stage for generating the positive step-up voltage VBP (corresponding to an output voltage) from the power supply voltage VCC (corresponding to an input voltage), and function as an output switch element, an energy storage element, a rectifying element, and a smoothing element respectively. As to specific connection relations, a first terminal of the inductor 156 is connected to an application terminal of the power supply voltage VCC. A second terminal of the inductor 156 is connected to a drain of the NMOSFET 151 and an anode (an application terminal of a switch voltage VSWP) of the diode 157. A source and a back gate of the NMOSFET 151 are connected to a ground terminal. A gate of the NMOSFET 151 is connected to an output terminal of the pre-driver 152 (an application terminal of a gate signal S13). A cathode of the diode 157 and a first terminal of the capacitor 158 are connected to an application terminal of the positive step-up voltage VBP. A second terminal of the capacitor 158 is connected to the ground terminal.

The pre-driver 152 generates the gate signal S13 in accordance with a control signal S12 from the controller 153. If the gate signal S13 is at a high level, the NMOSFET 151 is turned on, and if the gate signal S13 is at a low level, the NMOSFET 151 is turned off.

The controller 153 generates the control signal S12 to turn on/off the NMOSFET 151 in accordance with both an on-signal S11a and a zero-cross detection signal S11b. For example, the controller 153 switches the control signal S12 to a high level so as to turn on the NMOSFET 151 when the on-signal S11a becomes a high level after detecting a rising edge of the zero-cross detection signal S11b. After that, the controller 153 switches the control signal S12 to a low level so as to turn off the NMOSFET 151 at a predetermined switching timing (e.g., when a predetermined on-time passes). Besides, the controller 153 generates a switching signal S14 in accordance with the necessity of monitoring the zero-cross of an inductor current IL.

The feedback voltage generator 154a includes a resistance ladder (resistors a11 and a12) which is connected between the application terminal of the positive step-up voltage VBP and the ground terminal (an application terminal of a ground voltage GND), and outputs a feedback voltage V11 (a divided voltage of the positive step-up voltage VBP) in accordance with the positive step-up voltage VBP from a connection node between the resistor a11 and the resistor a12.

The feedback voltage generator 154b includes a resistance ladder (resistors b11 and b12) which is connected between the application terminal of switch voltage VSWP and the ground terminal (the application terminal of the ground voltage GND), and outputs a divided voltage V12 (a divided voltage of the switch voltage VSWP) in accordance with the switch voltage VSWP from a connection node between the resistor b11 and the resistor b12.

A main comparator 155a compares the feedback voltage V11 applied to an inverting input terminal (−) with a threshold voltage VREFP applied to a non-inverting input terminal (+) to generate the on-signal S11a (a bottom detection signal).

The on-signal S11a is at a low level when the feedback voltage V11 is higher than the threshold voltage VREFP, and the on-signal S11a is at the high level when the feedback voltage V11 is lower than the threshold voltage VREFP. In other words, the on-signal S11a is the low level when the positive step-up voltage VBP exceeds the bottom detection value, and the on-signal S11a is the high level when the positive step-up voltage VBP is less than the bottom detection value.

The zero-cross comparator 155b (a recirculation detection comparator) compares the divided voltage V11 applied to an inverting input terminal (−) with the feedback voltage V11 applied to a non-inverting input terminal (+) to generate the zero-cross detection signal S11b. In an input stage of the zero-cross comparator 155b, an input offset is applied so as to add a predetermined offset voltage Vofs to the feedback voltage V11. Accordingly, the zero-cross detection signal S11b becomes a low level when a relation of V12>V11+Vofs is satisfied, and the zero-cross detection signal S11b becomes a high level when a relation of V12<V11+Vofs is satisfied. In other words, the zero-cross detection signal S11b becomes the low level when the diode 157 is in a state of a forward bias (IL>0), and the zero-cross detection signal S11b becomes the high level when the diode 157 is not in a state of the forward bias (IL≤0). Here, the offset voltage Vofs may be set so as to become about 0.1V in terms of a voltage across both ends (=VSWP−VBP) of the diode 157.

Operation for generating the positive step-up voltage VBP will be explained. When the NMOSFET 151 is turned on, a current flows from a power supply terminal toward the ground terminal through the inductor 156 and the NMOSFET 151 to store its electric energy to the inductor 156. At this time, the switch voltage VSWP decreases to nearly the ground voltage GND through the NMOSFET 151, and besides, the diodes 157 becomes a state of a reverse bias and a backflow path from the capacitor 158 toward the NMOSFET 151 is cut off. On the other hand, when the NMOSFET 151 is turned off, the electric energy stored to the inductor 156 is emitted as the inductor current IL. At this time, the diode 157 is in a state of the forward bias, and besides, the inductor current IL flowing through the diode 157 flows into the ground terminal through the capacitor 158 and the capacitor 158 is charged to the positive polarity. The step-up switching regulator 150 repeats the on/off control of the NMOSFET 151 to generate the positive step-up voltage VBP from the power supply voltage VCC.

Besides, the step-up switching regulator 150 in the first structural example includes an PMOSFET [P-channel-type MOSFET] 151N, a pre-driver 152N, a controller 153N, a feedback voltage generator 154Na, a divided voltage generator 154Nb, a main comparator 155Na, a zero-cross comparator 155Nb, an inductor 156N, a diode 157N, and a capacitor 158N, as circuit elements for generating a negative step-up voltage VBN from the power supply voltage VCC. Here, the inductor 156N, the diode 157N, and the capacitor 158N are discrete parts provided in the form of external components to the motor drive device 1.

The PMOSFET 151N, the inductor 156N, the diode 157N, and the capacitor 158N are circuit elements which form a negative step-up type power output stage for generating the negative step-up voltage VBN (corresponding to an output voltage) from the power supply voltage VCC (corresponding to an input voltage), and function as an output switch element, an energy storage element, a rectifying element, and a smoothing element respectively. As to specific connection relations, a source and a back gate of the PMOSFET 151N are connected to the application terminal of the power supply voltage VCC. A drain of the PMOSFET 151N is connected to a first terminal of the inductor 156N and a cathode (an application terminal of a switch voltage VSWN) of the diode 157N. A gate of the PMOSFET 151N is connected to an output terminal of the pre-driver 152N (an application terminal of a gate signal S23). A second terminal of the inductor 156N is connected to the ground terminal. An anode of the diode 157N and a first terminal of the capacitor 158N are connected to an application terminal of the negative step-up voltage VBN. A second terminal of the capacitor 158N is connected to the ground terminal.

The pre-driver 152N generates the gate signal S23 in accordance with a control signal S22 from the controller 153. If the gate signal S23 is at a low level, the PMOSFET 151N is turned on, and if the gate signal S23 is at a high level, the PMOSFET 151N is turned off.

The controller 153N generates the control signal S22 to turn on/off the PMOSFET 151N in accordance with both an on-signal S21a and a zero-cross detection signal S21b. For example, the controller 153N switches the control signal S22 to a low level so as to turn on the PMOSFET 151N when the on-signal S21a becomes a high level after detecting a rising edge of the zero-cross detection signal S21b. After that, the controller 153N switches the control signal S22 to a high level so as to turn off the PMOSFET 151N at a predetermined switching timing (e.g., when a predetermined on-time passes). Besides, the controller 153N generates a switching signal S24 in accordance with the necessity of monitoring the zero-cross of an inductor current ILN.

The feedback voltage generator 154Na includes a resistance ladder (resistors a21 and a22) which is connected between the application terminal of the negative step-up voltage VBN and an application terminal of the internal power supply voltage VCA (e.g., 1.5V), and outputs a feedback voltage V21 (a divided voltage of the negative step-up voltage VBN) in accordance with the negative step-up voltage VBN from a connection node between the resistor a21 and the resistor a22.

The feedback voltage generator 154Nb includes a resistance ladder (resistors b21 and b22) which is connected between the application terminal of switch voltage VSWN and the application terminal of the internal power supply voltage VCA, and outputs a divided voltage V22 (a divided voltage of the switch voltage VSWN) in accordance with the switch voltage VSWN from a connection node between the resistor b21 and the resistor b22.

A main comparator 155Na compares the feedback voltage V21 applied to a non-inverting input terminal (+) with a threshold voltage VREFN applied to an inverting input terminal (−) to generate the on-signal S21a (a bottom detection signal). The on-signal S21a is at a low level when the feedback voltage V21 is lower than the threshold voltage VREFN, and the on-signal S21a is at a high level when the feedback voltage V21 is higher than the threshold voltage VREFN. In other words, the on-signal S21a is the low level when absolute value of the negative step-up voltage VBN exceeds the bottom detection value, and the on-signal S21a is the high level when the absolute value of the negative step-up voltage VBN is less than the bottom detection value.

The zero-cross comparator 155Nb (a recirculation detection comparator) compares the divided voltage V22 applied to a non-inverting input terminal (+) with the feedback voltage V21 applied to an inverting input terminal (−) to generate the zero-cross detection signal S21b. In an input stage of the zero-cross comparator 155Nb, an input offset is applied so as to subtract a predetermined offset voltage Vofs from the feedback voltage V21. Accordingly, the zero-cross detection signal S21b becomes a low level when a relation of V22<V21−Vofs is satisfied, and the zero-cross detection signal S21b becomes a high level when a relation of V1>V11−Vofs is satisfied. In other words, the zero-cross detection signal S21b becomes the low level when the diode 157N is in a state of a forward bias (ILN>0), and the zero-cross detection signal S11b becomes the high level when the diode 157N is not in a state of the forward bias (ILN≤0). Here, the offset voltage Vofs may be set so as to become about 0.1V in terms of a voltage across both ends (=VBN−VSWN) of the diode 157N.

Operation for generating the negative step-up voltage VBN will be explained. When the PMOSFET 151N is turned on, a current flows from the power supply terminal toward the ground terminal through the PMOSFET 151N and the inductor 156N to store its electric energy to the inductor 156N. At this time, the switch voltage VSWN increases to nearly the power supply voltage VCC through the PMOSFET 151N, and besides, the diodes 157N becomes a state of a reverse bias and a backflow path from the capacitor 158N toward the PMOSFET 151N is cut off. On the other hand, when the PMOSFET 151N is turned off, the electric energy stored to the inductor 156N is emitted as the inductor current ILN. At this time, the diode 157N is in a state of the forward bias, and besides, the inductor current ILN flowing through the diode 157N flows into the ground terminal through the capacitor 158N and the capacitor 158N is charged to the negative polarity. The step-up switching regulator 150 repeats the on/off control of the PMOSFET 151N to generate the negative step-up voltage VBN from the power supply voltage VCC.

Figure 3:
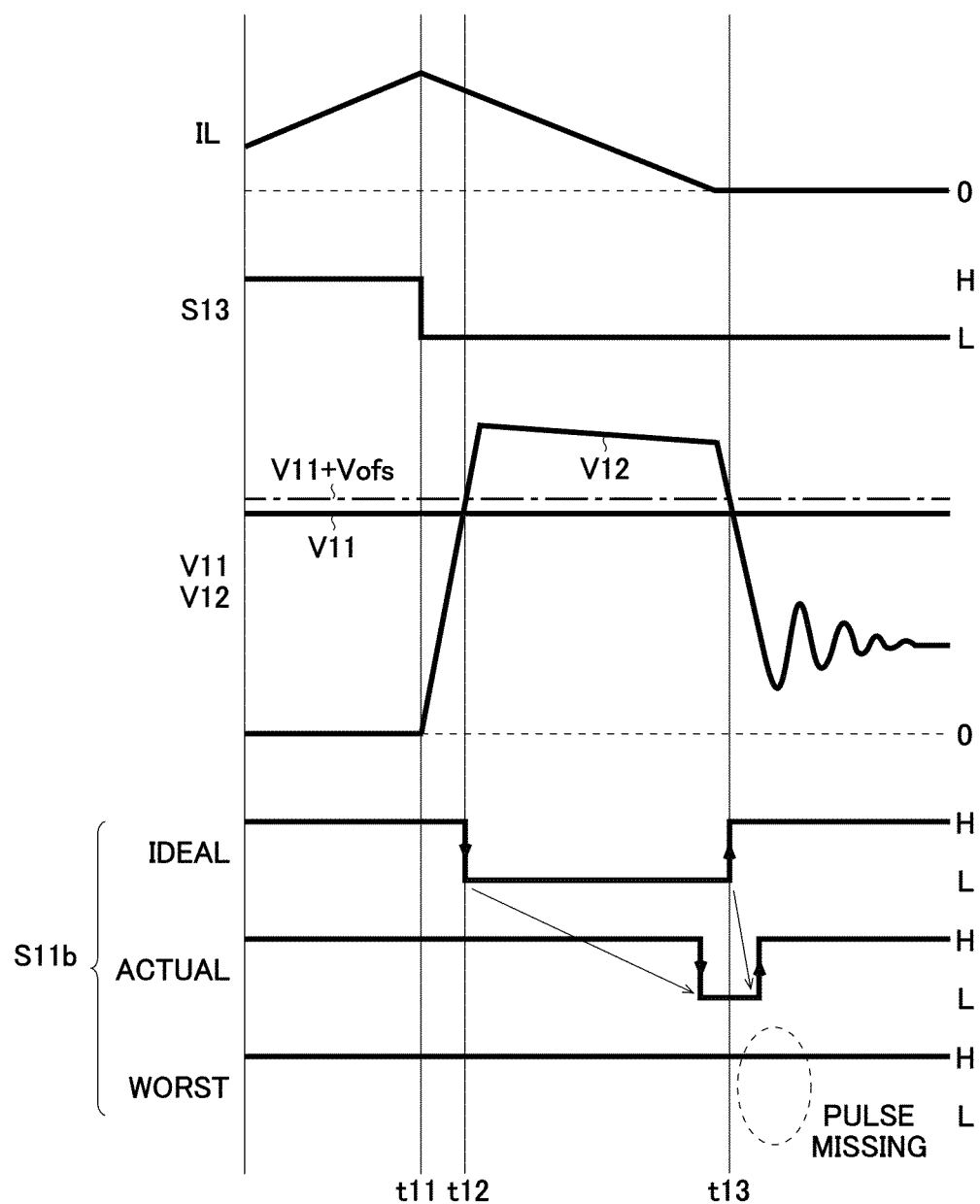
FIG. 3 is a timing chart showing an example of zero-cross detection operation in the first structural example.

FIG. 3 is a timing chart showing an example of zero-cross detection operation in the first structural example. The inductor IL, the gate signal S13, the feedback voltage V11 (assumption as a constant value), the divided voltage V12, and the zero-cross detection signal S11b are described in order from top. Here, the operation of the positive step-up side is described as an example. However, a duplicate description of the structure is omitted because the negative step-up side is basically the same operation as the positive step-up side except that output polarity of the negative step-up side is opposite to that of the positive step-up side.

At time t11, when the gate signal S13 is dropped to the low level, the NMOSFET 151 is turned off and the switch voltage VSWP (consequently, the divided voltage V12) increases from ground voltage GND (0V) steeply. At this time, the inductor current IL switches from a rise to a fall. However, with respect to the relation between the feedback voltage V11 and the divided voltage V12, a relation of V12<V11+Vofs is maintained and the zero-cross detection signal S11b keeps the high level.

After that, at time t12, the zero-cross detection signal S11b falls to a low level when the relation of V12>V11+Vofs is satisfied (see a waveform in an ideal state without delay).

After additional time has elapsed, if the electric energy stored to the inductor 156 run out and the diode 157 is not in a state of the forward bias any longer, the switch voltage VSWP (consequently, the divided voltage V12) decreases steeply. Besides, when the relation of V12<V11+Vofs is satisfied at time t13, the zero-cross detection signal S11b rises to the high level (see a waveform in an ideal state without delay).

That the zero crossing detection signal S11b rises to the high level means that the preparation for changing the inductor current IL flowing through the diode 157 into zero and for turning on the NMOSFET 151 again to store the electrical energy to the inductor 156 is complete (the on/off state of the NMOSFET 151 does not be repeated unnecessarily).

Therefore the controller 153 determines on-timing of the NMOSFET 151 in accordance with both the on-signal S11a and the zero-cross detection signal S11b so as to turn on the NMOSFET 151 after detecting the rising edge of the zero-cross detection signal S11b.

More specifically, the controller 153 switches the control signal S12 to the high level so as to turn on the NMOSFET 151 when the on-signal S11a becomes the high level after detecting the rising edge of the zero-cross detection signal S11b. To the contrary, the controller 153 does not turn on the NMOSFET 151 as far as the rising edge of the zero-cross detection signal S11b is not detected even if the on-signal S11a becomes the high level.

According to such a structure, it is possible to improve power conversion efficiency in a state where the inductor current IL flows through the diode 157 (a state where the electric energy remains to the inductor 156) because the on/off state of the NMOSFET 151 does not be repeated unnecessarily.

By the way, in a structure which always monitors the switch voltage VSWP with the zero-cross comparator 155b, after the NMOSFET 151 is turned off, a falling edge occurs prior to the rising edge of the zero-cross detection signal S11b when the relation of V12>V11+Vofs is satisfied.

If a pulse edge of the zero-cross detection signal S11b is an ideal state without delay, there are any problems as to the above-mentioned falling edge. However, the real circuit thereof generates the unavoidable delay to the pulse edge of the zero-cross detection signal S11b. In particular, in the falling edge of the zero-cross detection signal S11b, an amount of the delay thereof is large. Therefore, problems (output errors) can occur in the on-off control of the NMOSFET 151 because of pulse skips in the worst case.

Figure 4:
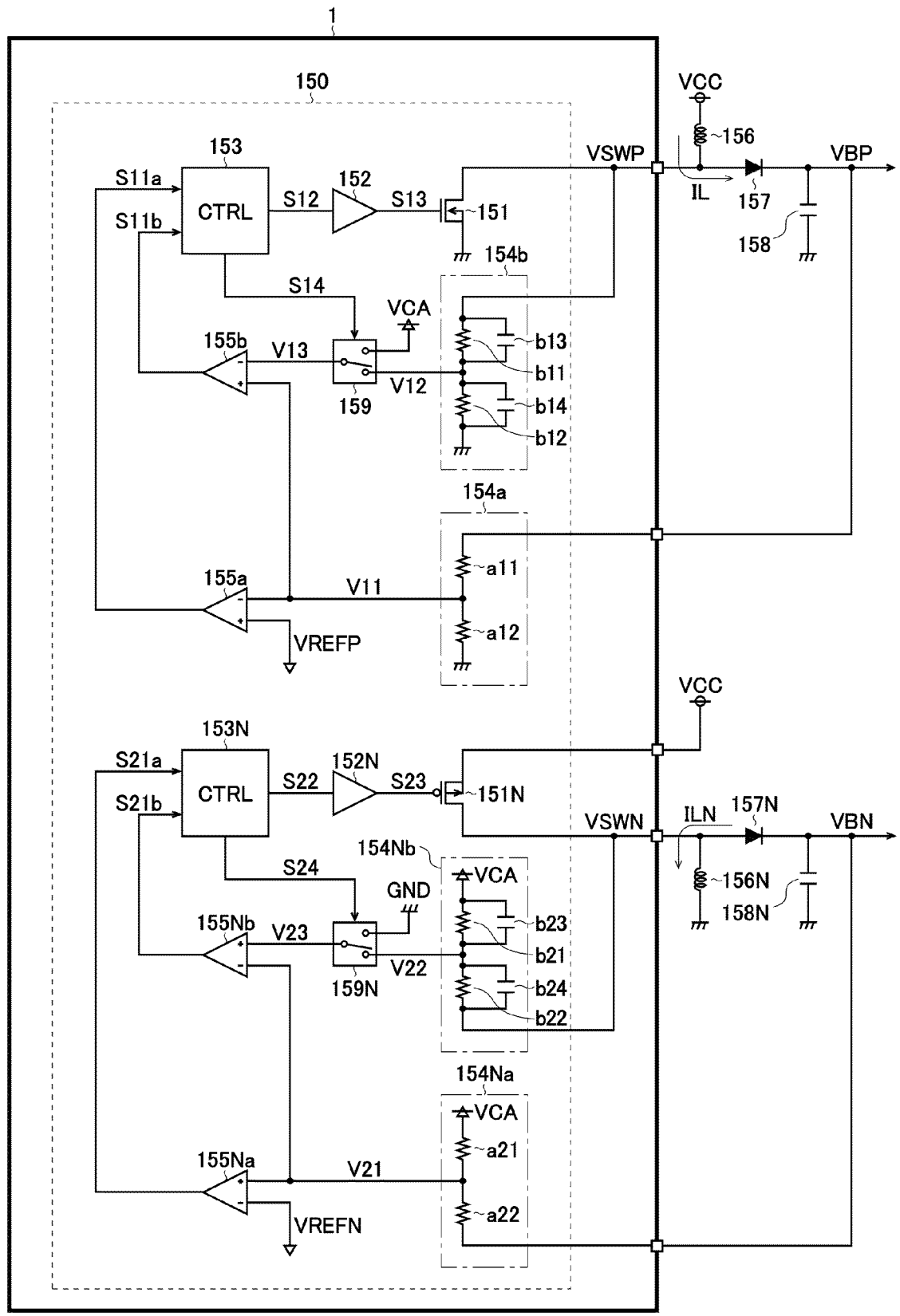
FIG. 4 is a block diagram showing a second structural example of a step-up switching regulator 150.

FIG. 4 is a block diagram showing a second structural example of a step-up switching regulator 150. The second structural example is basically similar structure to the first structural example, and has an additional selector and speed-up capacitor as characteristics. In FIG. 4, the same structural elements of the second structural example as those of the first structural example are marked with the same reference numerals shown in FIG. 2, and a duplicate description of the structural elements is omitted. The following description is focused on the characteristics of the second structural example.

The step-up switching regulator 150 in the second structural example further includes a selector 159, in addition to the NMOSFET 151, the pre-driver 152, the controller 153, the feedback voltage generator 154a, the divided voltage generator 154b, the main comparator 155a, the zero-cross comparator 155b, the inductor 156, the diode 157, and the capacitor 158, as circuit elements for generating the positive step-up voltage VBP from the power supply voltage VCC.

The selector 159 outputs one of the divided voltage V12 (e.g., 0V through 9.9V) and the internal power supply voltage VCA (e.g., 1.5V) as a select voltage V13 in accordance with the switching signal S14 inputted from the controller 153. More specifically, the selector 159 selects the divided voltage V12 when the switching signal S14 is at a high level (a logical level on selecting the divided voltage V12), and the selector 159 selects the internal power supply voltage VCA when the switching signal S14 is at a low level (a logical level on selecting the internal power supply voltage VCA). The zero-cross comparator 155b compares the feedback voltage V11 with the select voltage V13 to generate the zero-cross detection signal S11b. The controller 153 generates the switching signal S14 in accordance with the necessity of monitoring the zero-cross of the inductor current IL (details thereof will be described later).

In the step-up switching regulator 150 in the second structural example, the divided voltage generator 154b includes speed-up capacitors b13 and b14 connected to the resistance ladders b11 and b12 in parallel in addition to the resistance ladders b11 and b12 which generates the divided voltage V12 by dividing the switch voltage VSWP. According to such a structure, it is possible to improve response of the divided voltage V12 to steep variation of the switch voltage VSWP.

Besides, the step-up switching regulator 150 in the second structural example further includes a selector 159N in addition to the PMOSFET 151N, the pre-driver 152N, the controller 153N, the feedback voltage generator 154Na, the divided voltage generator 154Nb, the main comparator 155Na, the zero-cross comparator 155Nb, the inductor 156N, the diode 157N, and the capacitor 158N, as circuit elements for generating the negative step-up voltage VBN from the power supply voltage VCC.

The selector 159N outputs one of the divided voltage V22 (e.g., 0.5V through 3.5V) and the ground voltage GND (0V) as a select voltage V23 in accordance with the switching signal S24 inputted from the controller 153N. More specifically, the selector 159N selects the divided voltage V22 when the switching signal S24 is at a high level (a logical level on selecting the divided voltage V22), and the selector 159N selects the ground voltage GND when the switching signal S24 is at a low level (a logical level on selecting the ground voltage GND). The zero-cross comparator 155Nb compares the feedback voltage V21 with the select voltage V23 to generate the zero-cross detection signal S21b. The controller 153N generates the switching signal S24 in accordance with the necessity of monitoring the zero-cross of the inductor current ILN (details thereof will be described later).

In the step-up switching regulator 150 in the second structural example, the divided voltage generator 154Nb includes speed-up capacitors b23 and b24 connected to the resistance ladders b21 and b22 in parallel in addition to the resistance ladders b21 and b22 which generates the divided voltage V22 by dividing the switch voltage VSWN. According to such a structure, it is possible to improve response of the divided voltage V22 to steep variation of the switch voltage VSWN.

Figure 5:
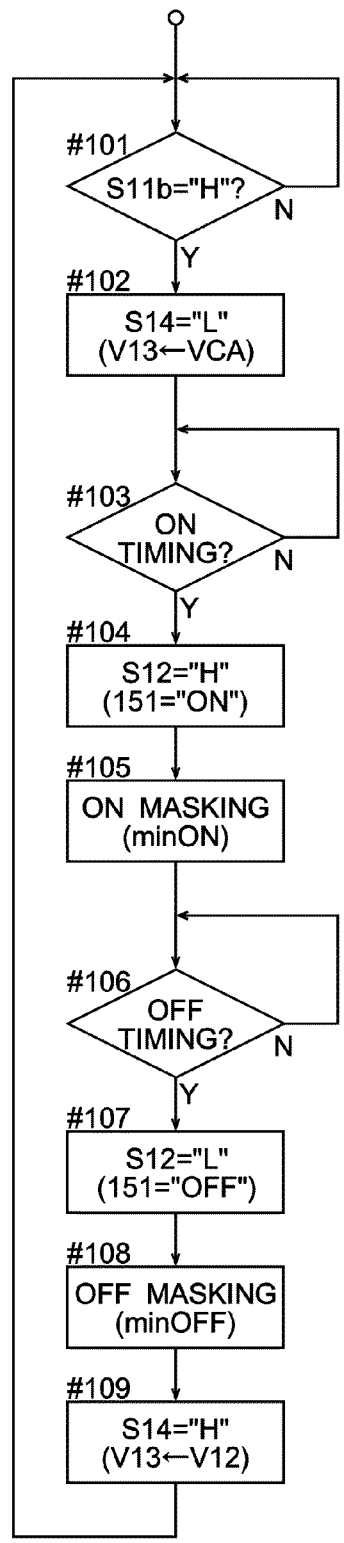
FIG. 5 is a flow chart showing an example of selector switching control.

FIG. 5 is a flow chart showing an example of selector switching control which the controller 153 mainly executes. Here, the operation of the positive step-up side is described as an example. However, a duplicate description of the structure is omitted because the negative step-up side is the same operation as the positive step-up side.

In this flow, the NMOSFET 151 is turned off, and starts from a state where the switching signal S14 is set to the high level (the logical level on selecting the divided voltage V12). In step #101, the determination is performed whether the zero-cross detection signal S11 is at the high level (a logical level on the zero-cross detection) or not. In case of a "yes" determination in step #101, the flow proceeds to step #102. On the other hand, in case of a "no" determination in step #101, the flow returns to step #101 to continue the above-mentioned determination.

In case of the "yes" determination in step #101, the switching signal S14 is set to the low level (the logical level on selecting the internal power supply voltage VCA) in step #102. Consequently, the selector 159 is changed into a state where the internal power supply voltage VCA is outputted as the select voltage V13.

After that, in step #103, the determination is performed whether on-timing of the NMOSFET 151 is arriving or not, more specifically, whether the on-signal S11a has risen to the high level or not. In case of a "yes" determination in step #103, the flow proceeds to step #104. On the other hand, in case of a "no" determination in step #103, the flow returns to step #103 to continue the above-mentioned determination.

In case of the "yes" determination in step #103, the switch signal S12 (consequently, the gate signal S13) is set to the high level and the NMOSFET 151 is turned on in step #104. In the subsequent step #105, signal processing (on-masking processing) is performed, which maintains the NMOSFET 151 in the on-state during a minimum on-time (minON) without depending on the feedback state of the positive step-up voltage VBP after the NMOSFET 151 is turned on.

After that, in step #106, the determination is performed whether off-timing of the NMOSFET 151 is arriving or not. Here, with respect to technical skills for the determination of the off-timing, any technical skill for the determination like an on-time fixed method or a window comparator method can be adopted. In case of a "yes" determination in step #106, the flow proceeds to step #107. On the other hand, in case of a "no" determination in step #106, the flow returns to step #106 to continue the above-mentioned determination.

In case of the "yes" determination in step #106, the switch signal S12 (consequently, the gate signal S13) is set to the high level and the NMOSFET 151 is turned off in step #107. In the subsequent step #108, signal processing (off-masking processing) is performed, which maintains the NMOSFET 151 in the off-state during a minimum off-time (minOFF) without depending on the feedback state of the positive step-up voltage VBP after the NMOSFET 151 is turned off.

After that, the switching signal S14 is set to the high level in step #109 (the logical level on selecting the divided voltage V12). Consequently, the selector 159 is changed into a state where the divided voltage V12 is outputted as the select voltage V13. After that, a series of processing is repeated as the above.

Figure 6:
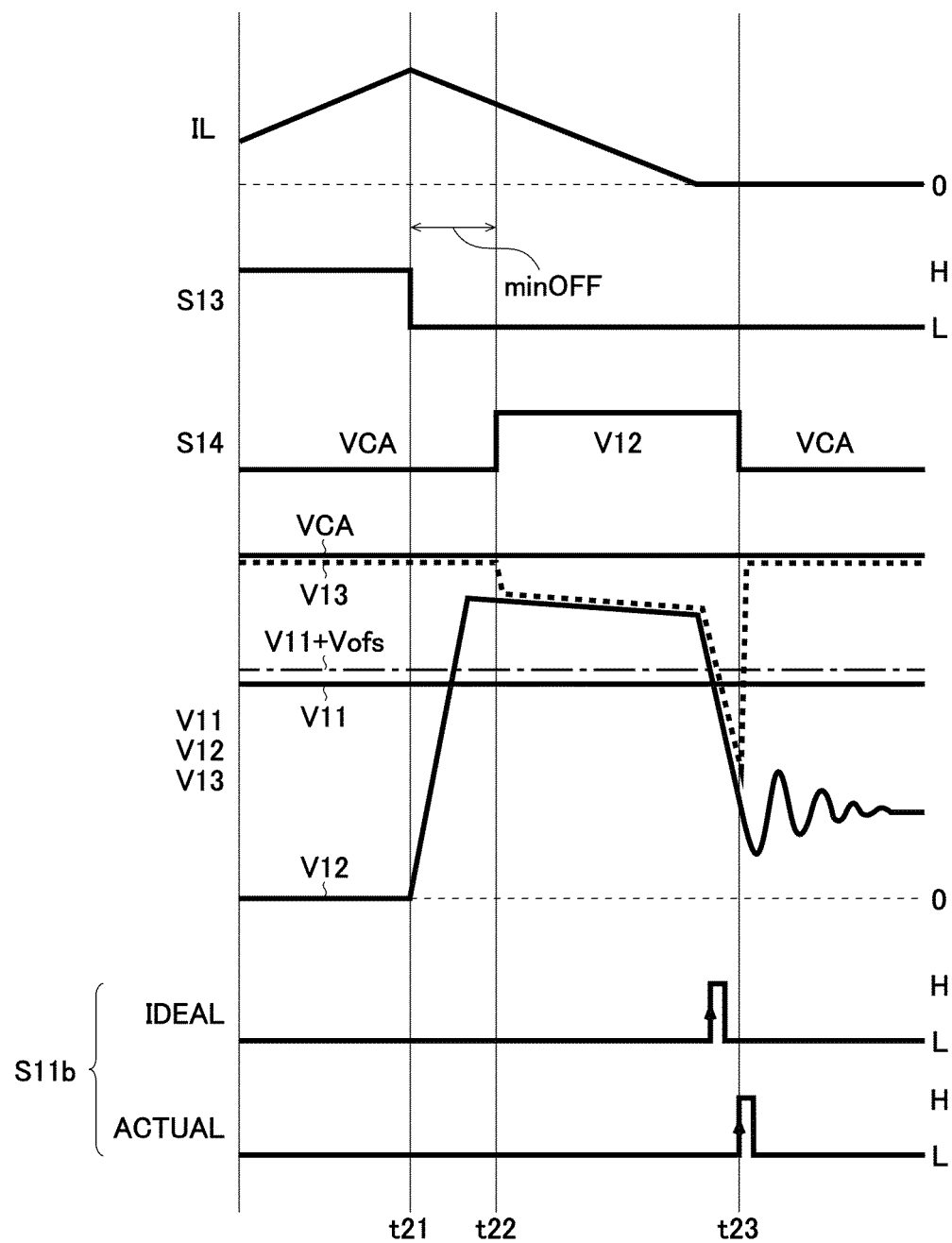
FIG. 6 is a timing chart showing an example of zero-cross detection operation in the second structural example.

FIG. 6 is a timing chart showing an example of zero-cross detection operation in the second structural example. The inductor IL, the gate signal S13, the switching signal S14, the feedback voltage V11 (assumption as a constant value), the divided voltage V12, the select voltage V13 (dashed lines), and the zero-cross detection signal S11b are described in order from top. Here, the operation of the positive step-up side is described as an example. However, a duplicate description of the structure is omitted because the negative step-up side is basically the same operation as the positive step-up side except that output polarity of the negative step-up side is opposite to that of the positive step-up side.

At time t21, when the gate signal S13 is dropped to the low level, the NMOSFET 151 is turned off and the switch voltage VSWP (consequently, the divided voltage V12) increases from ground voltage GND (0V) steeply. At this time, switching signal S14 becomes the low level, and outputs the internal power supply voltage VCA higher than the feedback voltage V11 at all time as the select voltage V13. Therefore, the zero-cross detection signal S11b is set to the low level.

After that, in time t22 when the minimum off-time (minOFF) has passed, the controller 153 determines that the zero-cross monitor of the inductor current IL is necessary and the controller 153 raises the switching signal S14 to the high level. Consequently, the selector 159 outputs the divided voltage V12 as the select voltage V13, and the zero-cross-comparator 155b compares the feedback voltage V11 with the divided voltage V12. In the above-mentioned case, the feedback voltage V11 and the divided voltage V12 satisfies the relation of V12>V11+Vofs, and the zero-cross detection signal S11b keeps the low level.

After additional time has elapsed, if the electric energy stored to the inductor 156 run out and the diode 157 is not in a state of the forward bias any longer, the switch voltage VSWP (consequently, the divided voltage V12) decreases steeply. Besides, when the relation of V12<V11+Vofs is satisfied at time t23, the zero-cross detection signal S11b rises to the high level (see a waveform in an ideal state without delay). At this time, the controller 153 recognizes that the preparation for turning on the NMOSFET 151 again to store the electrical energy to the inductor 156 is complete. After that, the control signal S12 is set to the high level so as to turn on the NMOSFET 151 when the on-signal S11a becomes the high level. This operation is similar to the above-mentioned first structural example.

Besides, when the zero-cross detection signal S11b rises to the high level, the controller 153 determines that the zero-cross monitor of the inductor current IL is unnecessary after the NMOSFET 151 is turned off at least until the minimum off-time (minOFF) passes, and the controller 153 drops the switching signal S14 to the low level. Consequently, the selector 159 compares the feedback voltage V11 and the internal voltage VCA to fix the zero-cross signal S11b to the low level.

As the above description, with respect to the step-up switching regulator 150 in the second structural example, the controller 153 selects the divided voltage V12 with the selector 159 when the predetermined minimum off-time (minOFF) passes after turning off the NMOSFET 151. After that, the switching signal S14 is generated so as to select the fixed internal power supply voltage VCA with the selector 159 when the zero-cross detection signal S11b becomes the high level (the logical level on the zero-cross detection).

According to such a structure, it is possible to prevent the pulse skips of the zero-cross comparator 155b because the falling edge does not occur earlier than the rising edge of the zero-cross detection signal S11b unlike the above first structural example. Besides, problems may not occur in the on/off control of the NMOSFET 151.

In the above-mentioned first and second embodiments, the switching regulators are described as examples, which have the power output stages of the positive step-up type or the negative step-up type. However, the power output stages may be formed as a step-down type or a step-up/down type. Besides, their output polarity is not required whether it is positive or negative.

<Application to Hard Disk Drive>

Figure 7:
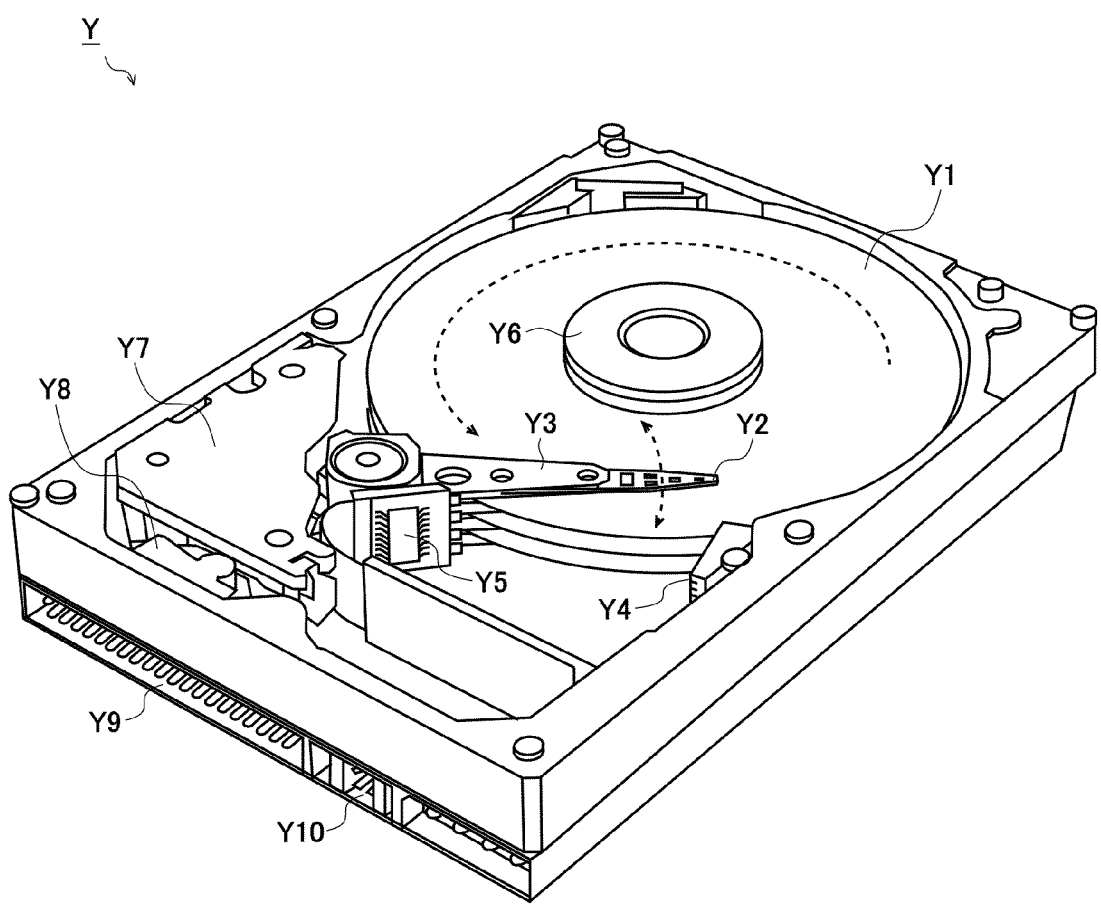
FIG. 7 is a perspective view showing a structural example of a hard disk drive provided with a motor drive device.

FIG. 7 is a perspective view (with a top cover removed) showing a structural example of a hard disk drive that incorporates the motor drive device. A hard disk drive Y in the present structural example is a kind of magnetic disk storage device and has: a platter Y1; a magnetic head Y2; a swing arm Y3; a lamp mechanism Y4; a head amplifier Y5; a spindle motor Y6; a voice coil motor Y7; a latch mechanism Y8; an interface connector Y9; and a jumper switch Y10.

The platter Y1 is a magnetic disk that is formed by laminating a magnetic layer on a surface of an aluminum board or a glass board. One hard disk drive Y incorporates one to four platters Y1.

The magnetic head Y2 reads and writes data to and from the platter Y1.

The swing arm Y3 holds the magnetic head Y2 at a tip end thereof.

The lamp mechanism Y4 is an evacuation place for the magnetic head Y2 during a time the platter Y1 does not rotate, and is disposed further outside an outermost circumference of the platter Y1.

The head amplifier Y5 amplifies a regenerative signal obtained by the magnetic head Y2.

The spindle motor Y6 (corresponding to the spindle motor 2 in FIG. 1) rotates the platter Y1 at predetermined rotation speeds (4200 rpm, 5400 rpm, 7200 rpm, 10000 rpm, 15000 rpm and the like).

The voice coil motor Y7 (corresponding to the voice coil motor 3 in FIG. 1) moves the swing arm Y3 in an arc, thereby moving the magnetic head Y2 in a radial direction of the platter Y1.

The latch mechanism Y8 holds the swing arm Y3 during a time the hard disk drive Y is stopped.

The interface connector Y9 is connected to a host interface circuit, which is mounted on a mother board of a personal computer and the like, over a cable.

The jumper switch Y10 is a switch for performing the machine setting (master/slave and the like) of the hard disk drive Y by means of a jumper pin when connecting a plurality of the hard disk drives to one personal computer.

Here, though not shown in FIG. 7, the hard disk drive Y is provided with a printed board on which the microcomputer (Soc) and various electronic circuits are mounted. The motor drive device 1 in FIG. 1 is mounted on the above-mentioned printed board as a means for driving the spindle motor Y6 and the voice coil motor Y7.

<Application to Desktop Personal Computer>

Figure 8:
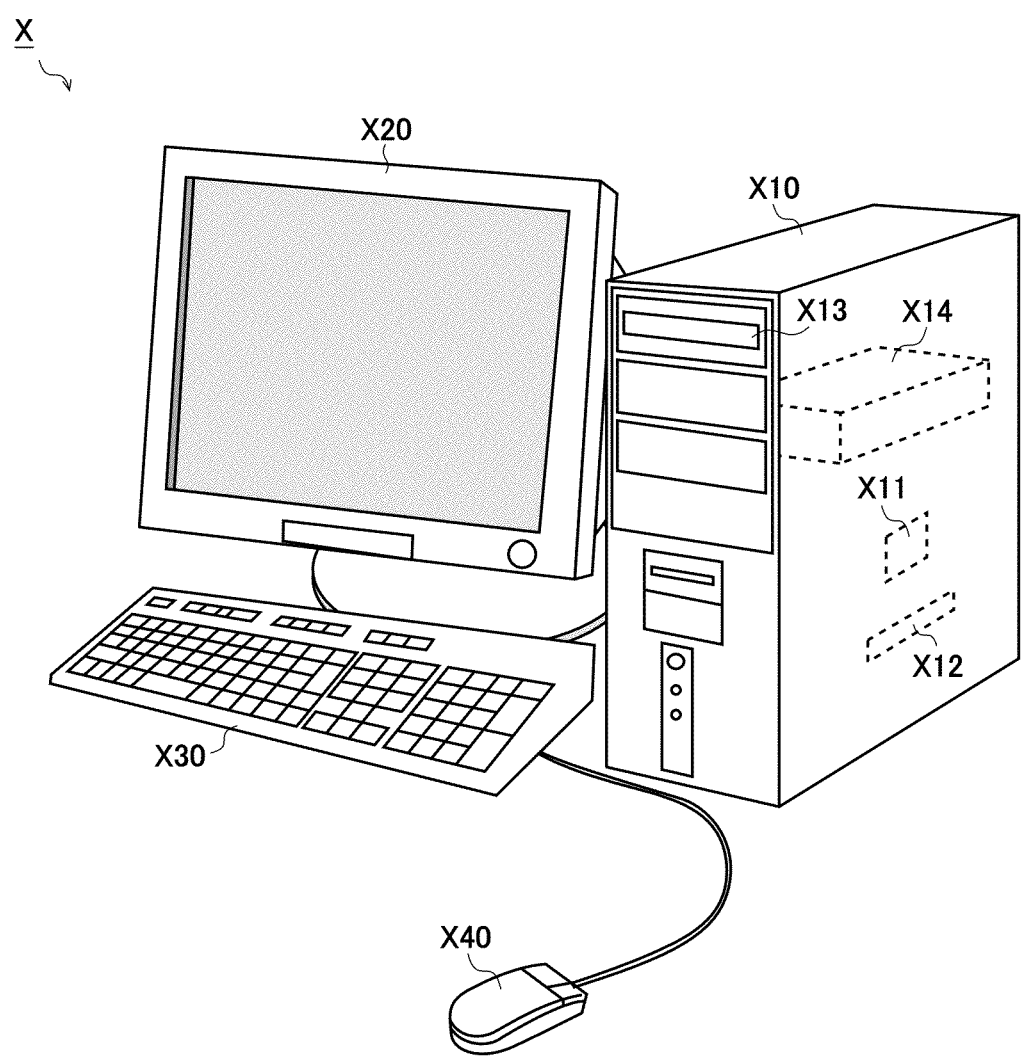
FIG. 8 is an appearance view showing a structural example of a personal computer that incorporates a hard disk drive.

FIG. 8 is an appearance view showing a structural example of a desktop personal computer that incorporates the hard disk drive. A desktop personal computer X in the present structural example has: a main body case X10; a liquid crystal monitor X20; a keyboard X30; and a mouse X40.

The main body case X10 houses: a central processing unit X11; a memory X12; an optical drive X13; a hard disk drive X14 and the like.

The central processing unit X11 executes an operating system and various application programs stored in the hard disk drive X14, thereby controlling comprehensively operation of the desktop personal computer X.

The memory X12 is used as a working region (e.g., a region for storing task data when executing a program) for the central processing unit X11.

The optical drive X13 performs reading/writing of data to and from an optical disk. As the optical disk, there are a CD [compact disk], a DVD [digital versatile disc], a BD [Blu-ray disc] and the like.

The hard disk drive X14 (corresponding to the hard disk drive Y in FIG. 7) is a large-capacity auxiliary storage device that stores the programs and data in a non-volatile way by means of a magnetic disk sealed tightly in the housing.

The liquid crystal monitor X20 outputs an image based on an instruction from the central processing unit X11.

The keyboard X30 and the mouse X40 are each a human interface device that accepts operation by a user.

<Other Modifications>

In the above embodiments, a hard disk drive is given as an example of applications which incorporate the motor drive device. Besides, it is possible to incorporate the motor drive device into the applications other than the hard disk drive.

In addition, in the above embodiments, a desktop personal computer is given as an example of electronic apparatus which incorporate the hard disk drive. Besides, it is possible to incorporate the hard disk drive into the electronic apparatus (laptop computers, tablet personal computers, hard disk recorders, audio players, game machines and the like) other than the desktop personal computer.

Besides, in addition to the above embodiments, it is possible to add various modifications to the invention disclosed in the present specification without departing the spirit of the technological creation. In other words, it should be understood that the above embodiments are examples in all respects and are not limiting, the technological scope of the present invention is not indicated by the above embodiments but by the claims, and all modifications within the scope of the claims and the meaning equivalent to the claims are covered.

INDUSTRIAL APPLICABILITY

The invention disclosed in the present specification is usable, for example, as a system motor driver LSI for a HDD [hard disk drive] controller.

LIST OF REFERENCE NUMERALS 1 motor drive device (semiconductor integrated circuit device)
2 spindle motor
3 voice coil motor
4 capacitor
5 microcomputer (SoC)
10 spindle motor driver
20 voice coil motor driver
30 isolation switch (NMOSFET)
40 power voltage monitor
50 A/D converter
60 logic unit
70 register
80 serial interface
90 charge pump
100, 110, 120 internal regulators (digital/analog/lower side gates)
130 step-down switching regulator (positive output type)
140 inverting switching regulator (negative output type)
150 step-up switching regulator (positive and negative output type)
151 NMOSFET (output switch element)
151N PMOSFET (output switch element)
152, 152N pre-drivers
153, 153N controllers
154a, 154Na feedback voltage generators
a11, a12, a21, a22 resistors
154b, 154Nb divided voltage generators
b11, b12, 21, b22 resistors
b13, b14, b23, b24 speed-up capacitors
155a, 155Na main comparators
155b, 155Nb zero-cross comparators
156, 156N inductors
157, 157N diodes (rectifying elements)
158, 158N capacitors (smoothing elements)
159, 159N selectors
L1 power supply line
X desktop personal computer
X10 main body case
X11 central processing unit
X12 memory
X13 optical drive
X14 hard disk drive
X20 liquid crystal monitor
X30 keyboard
X40 mouse
Y hard disk drive
Y1 platter (magnetic disk)
Y2 magnetic head
Y3 swing arm
Y4 lamp mechanism
Y5 head amplifier
Y6 spindle motor
Y7 voice coil motor
Y8 latch mechanism
Y9 interface connector
Y10 jumper switch

What is claimed is:

1. A switching regulator comprising:
an output stage which, with an output switch element, an inductor, a rectifying element, and a smoothing element, generates an output voltage from an input voltage;
a divided voltage generator which generates a divided voltage from a switch voltage generated at one terminal of the rectifying element;
a selector which outputs one of the divided voltage and a fixed voltage in accordance with a switching signal as a select voltage;
a zero-cross comparator which monitors the select voltage to generate a zero-cross detection signal; and
a controller which generates the switching signal in accordance with the necessity of monitoring the zero-cross of an inductor current and which performs on/off control of the output switch element reflecting the zero-cross detection signal.

2. The switching regulator according to claim 1, wherein the controller selects the divided voltage with the selector when a predetermined time passes after the output switch element is turned off, and after that, generates the switching signal so as to select the fixed voltage with the selector when the zero-cross detection signal becomes a logical level on the zero-cross detection.

3. The switching regulator according to claim 2, wherein the predetermined time is a minimum off-masking time for maintaining the output switch element in an off-state without depending on a feedback state of the output voltage after the output switch is turned off.

4. The switching regulator according to claim 1, wherein the controller turns on the output switch element after the zero-cross detection signal becomes the logical level on the zero-cross detection.

5. The switching regulator according to claim 1, the divided voltage generator includes:
a resistance ladder which divides the switch voltage to generate the divided voltage; and
a speed-up capacitor which is connected to the resistance ladder in parallel.

6. The switching regulator according to claim 1, further comprising:
a feedback voltage generator which generates a feedback voltage in accordance with the output voltage; and
a main comparator which compares the feedback voltage and a threshold voltage to generate an on-signal, wherein
the controller determine on-timing of the output switch element in accordance with both the on-signal and the zero-cross detection signal.

7. The switching regulator according to claim 1, the output stage is a step-up type, a step-down type, or step-up/down type.

8. The switching regulator according to claim 1, the output stage is a positive output type or a negative output type.

9. A motor drive device comprising:
a spindle motor driver which drives a spindle motor;
a voice coil motor driver which drives a voice coil motor; and
a switching regulator, wherein
the switching regulator comprises:

an output stage which, with an output switch element, an inductor, a rectifying element, and a smoothing element, generates an output voltage from an input voltage;

a divided voltage generator which generates a divided voltage from a switch voltage generated at one terminal of the rectifying element;

a selector which outputs one of the divided voltage and a fixed voltage in accordance with a switching signal as a select voltage;

a zero-cross comparator which monitors the select voltage to generate a zero-cross detection signal; and a controller which generates the switching signal in accordance with the necessity of monitoring the zero-cross of an inductor current and which performs on/off control of the output switch element reflecting the zero-cross detection signal.

10. A magnetic disk storage device comprising:

a platter;

a magnetic head which reads and writes data to and from the platter;

a swing arm which holds the magnetic head at a tip end thereof;

a spindle motor which rotates the platter;

a voice coil motor which moves the swing arm in an arc; and a motor drive device which drives the spindle motor and the voice coil motor, and which provides the output voltage for relevant parts of the magnetic disk storage device, wherein the motor drive device comprises:

a spindle motor driver which drives the spindle motor;

a voice coil motor driver which drives the voice coil motor; and a switching regulator, wherein the switching regulator comprises:

an output stage which, with an output switch element, an inductor, a rectifying element, and a smoothing element, generates an output voltage from an input voltage;

a divided voltage generator which generates a divided voltage from a switch voltage generated at one terminal of the rectifying element;

a selector which outputs one of the divided voltage and a fixed voltage in accordance with a switching signal as a select voltage;

a zero-cross comparator which monitors the select voltage to generate a zero-cross detection signal; and a controller which generates the switching signal in accordance with the necessity of monitoring the zero-cross of an inductor current and which performs on/off control of the output switch element reflecting the zero-cross detection signal.

11. An electronic appliance comprising:

a magnetic disk storage device, wherein the magnetic disk storage device comprises:

a platter;

a magnetic head which reads and writes data to and from the platter;

a swing arm which holds the magnetic head at a tip end thereof;

a spindle motor which rotates the platter;

a voice coil motor which moves the swing arm in an arc; and a motor drive device which drives the spindle motor and the voice coil motor, and which provides the output voltage for relevant parts of the magnetic disk storage device, wherein the motor drive device comprises:

a spindle motor driver which drives the spindle motor;

a voice coil motor driver which drives the voice coil motor; and a switching regulator, wherein the switching regulator comprises:

an output stage which, with an output switch element, an inductor, a rectifying element, and a smoothing element, generates an output voltage from an input voltage;

a divided voltage generator which generates a divided voltage from a switch voltage generated at one terminal of the rectifying element;

a selector which outputs one of the divided voltage and a fixed voltage in accordance with a switching signal as a select voltage;

a zero-cross comparator which monitors the select voltage to generate a zero-cross detection signal; and a controller which generates the switching signal in accordance with the necessity of monitoring the zero-cross of an inductor current and which performs on/off control of the output switch element reflecting the zero-cross detection signal.

* * * * *